United States Patent [19]

Hanley et al.

[11] Patent Number: 4,744,207
[45] Date of Patent: May 17, 1988

[54] PROGRAMMABLE COMPACTOR FOR COTTON HARVESTER

[75] Inventors: Michael J. Hanley, Chicago; Gary L. Wells, Downers Grove; Robert M. Fachini, Naperville, all of Ill.

[73] Assignee: J. I. Case Company, Racine, Wis.

[21] Appl. No.: 899,614

[22] Filed: Aug. 25, 1986

[51] Int. Cl.[4] ............................................ A01D 46/08
[52] U.S. Cl. .................................... 56/16.6; 56/10.2; 56/28
[58] Field of Search .................... 56/16.6, 10.2, 12.8, 56/DIG. 15, 341, 28; 100/341; 364/424

[56] References Cited

U.S. PATENT DOCUMENTS

| 4,520,617 | 6/1985 | Fachini et al. | 56/28 |
| 4,527,241 | 7/1985 | Sheehan et al. | 56/10.2 |
| 4,551,801 | 11/1985 | Sokol | 56/10.2 |
| 4,624,179 | 11/1986 | Yves et al. | 100/4 |
| 4,635,047 | 1/1987 | Fox et al. | 56/10.2 |

Primary Examiner—John Weiss
Attorney, Agent, or Firm—Dressler, Goldsmith, Shore, Sutker & Milnamow, Ltd.

[57] ABSTRACT

In a self-propelled cotton harvester, a microprocessor circuit associated with the cotton compactor for automatically controlling the operating cycles of the compactor. A digital counter-type transducer is associated with the transmission gear or drive wheel and counts the number of revolutions of that member. Once the operator has entered in the microprocessor memory the starting time of the compactor operation in relation to the number of revolutions of the drive gear or wheel, each cotton picking cycle thereafter proceeds automatically without intervention by the operator, so that operation of the compactor begins at substantially the same point in each cotton load.

3 Claims, 1 Drawing Sheet

PROGRAMMABLE COMPACTOR FOR COTTON HARVESTER

BACKGROUND OF THE INVENTION

This invention relates to cotton harvesters and, more particularly, to controls for the compactors in the baskets of cotton harvesters. More specifically, the invention relates to a programmable control for cotton harvester compactors.

Self-propelled cotton harvesters are well known and have been in use for many years. In general, such cotton harvesters comprise a wheeled implement having an engine, transmission gears associated with the wheels and operator controls for driving the implement. Picking units including drums carrying spindles and doffers are mounted at the front of the implement and a blower transports the picked and doffed cotton to a receptable, commonly called a basket, mounted on the rear portion of the implement. Hydraulic means is associated with the basket for dumping a full load of cotton therefrom into a wagon or the like.

As the picked cotton is blown into the basket, it is light and fluffy so that it has low bulk density which results in inefficient utilization of basket capacity. In order to deal with this problem so that each basket load will contain an optimum weight of cotton for the fixed basket volume, cotton harvesters commonly are equipped with some type of compactor for tamping down and increasing the density of the cotton blown into the basket. Two basic forms of compactor have been widely employed; an open vane form whch can be pivotably reciprocated in the basket, and an auger which can be rotated to transport and compact the cotton in the basket. In either case, the implement operator must use his discretion to activate the compactor in either of two modes, continuous operation until turned off or until the control lever is released, or individual short cycles manually controlled from a control panel.

It is well known to those skilled in the art that the timing and mode of operation of the compactor is most important in determining the final efficiency of the entire harvesting operation. Heretofore, operation of the compactor has been controlled by the operator at his discretion. In a cotton harvester previously manufactured by the assignee of the subject invention, the operator has a choice of manual or automatic control. In the manual mode, the operator pushes a switch to activate the compactor through a three-stroke cycle and back to the dwell position. In the automatic mode, the operator sets the switch to "automatic" and the compactor operates through successive three-stroke cycles with a dwell period between each cycle. A variable control regulates the length of the dwell time at the operator's discretion to match the compactor's work to the cotton harvesting rate which is in turn dependent on such factors as the density of the standing crop and the ground speed of the harvester. Typically, the compactor strokes are approximately three seconds apart and the dwell time is adjustable from zero to approximately six minutes.

In the described operation, the operator must determine when to start the compactor in the course of picking each load of cotton. If he starts too early, energy will be wasted in operating the compactor needlessly; and the total cotton load will be reduced because the compactor, in stroking down and up through the streams of blown cotton will prevent complete filling of the rear of the basket. If the operator starts the compactor too late, he will have to proceed with harvesting at a reduced speed during the remaining part of that particular load to afford the compactor time to work effectively.

Other problems sometimes arise when the operator inadvertently forgets to turn the compactor off after unloading a basket-load of cotton. In that event, the compactor will cycle wastefully until turned off or until its use is required again after the next partial load of cotton has been picked.

Typically, an operator will harvest from just a few to as many as 50 loads of cotton per day, and a properly compacted load will contain up to 20 percent more cotton than an uncompacted load. There thus exists a need for means to reduce, to the greatest extent possible, operator discretion over operation of the compactor.

SUMMARY OF THE INVENTION

The present invention provides a means for greatly reducing the discretion and decision-making requirements of the operator in efficiently operating the compactor.

Briefly, the invention comprises a programmable control which senses, or is responsive to, the revolutions of the transmission gear or driving wheel of the harvester. At the start of work, or before the first pass through the cotton field, the operator can set the control in an automatic mode and select the approximate yield of the cotton in that field. Means is provided for sensing and electronically recording the gear or wheel revolutions as the harvester begins moving through the crop. When the operator perceives that the amount of picked cotton in the basket is appropriate to begin operation of the compactor, he can press switch means which electronically records the number of revolutions to that point and begins operation of the compactor. The compactor dwell time is automatically regulated as a function of the yield setting.

Cotton picking thereafter proceeds with the compactor operating automatically until the operator disengages the fan and picker drum drive when the basket is full or the harvester emerges from the row of crops for unloading of the basket. Means is provided for sensing the opening of the basket door for unloading and automatically resetting the controller for the next basket load. When the harvester next enters the crop rows and the operator engages the fan and picker drum drive and begins movement and harvesting, the programmed control automatically senses the revolutions of the transmission gear or drive wheel and begins operation of the compactor when the recorded number has been reached. The described programmed cycle is then automatically repeated for each of the successive loads of cotton picked during that workday, or until a new program is established by the operator.

According to the invention, the operator is required to use his discretion only at the beginning of the workday to establish the programmed control. Thereafter, efficient picking and compacting proceeds completely automatically.

Other features and advantages of the invention will be apparent from the following description and claims and are illustrated in the accompanying drawings which show structure embodying preferred features of the present invention and the principles thereof.

BRIEF DESCRIPTION OF THE DRAWINGS

In the accompanying drawings forming a part of the specification, and in which like numerals are employed to designate like parts throughout the same.

DETAILED DESCRIPTION OF THE INVENTION

Figure 1:
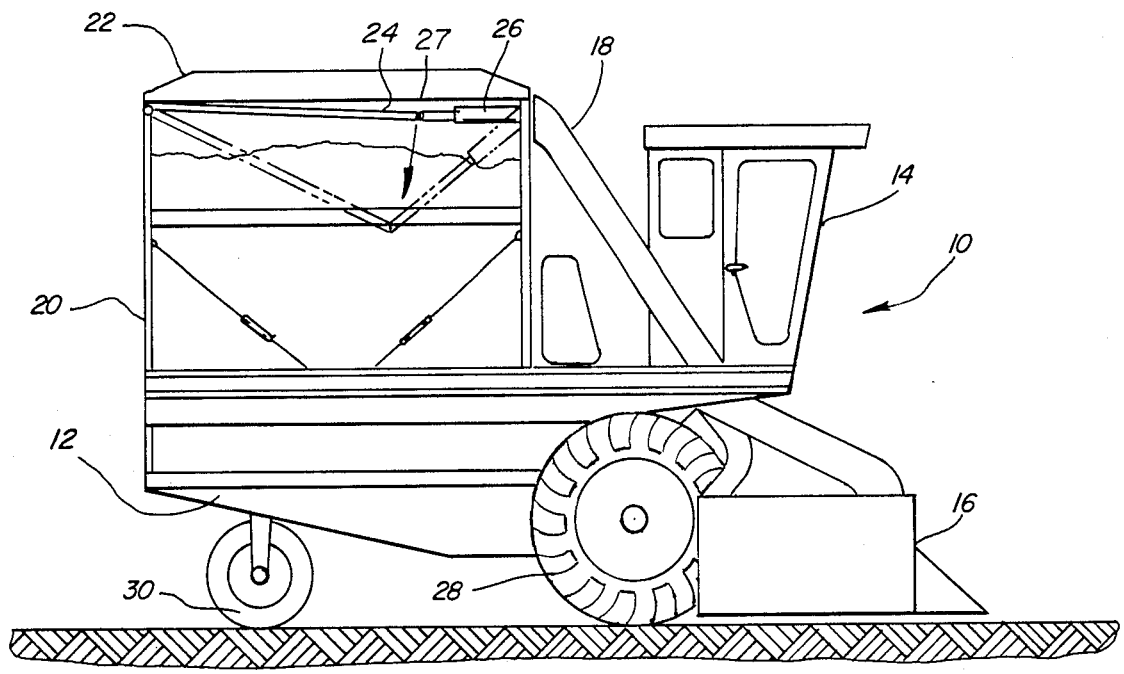
FIG. 1 is a side elevational view of a cotton harvestor having the present invention incorporated therein.

Referring with greater particularity to the drawings, it will be seen that the reference number 10 indicates generally a cotton harvester of the type into which the present invention can be incorporated. Harvester 10 is basically conventional in structure and operation, and only so much thereof as is necessary for an understanding of the present programmable compactor invention has been illustrated and will be described.

Cotton harvester 10 comprises a chassis 12 carrying an operator's cab 14 adjacent the front thereof. Cotton picking units such as 16 are carried at the front of the chassis 12 and said units contain conventional spindle rotors, doffers, and air blower chambers (not shown). Picked cotton is blown through ducts such as 18 into a basket 20 which is mounted on the rear portion of the chassis 12 by hydraulic means (not shown) for emptying a load of cotton therefrom into a collecting wagon or the like.

Basket 20 comprises a top wall or door 22 which may be pivoted for dumping in conventional manner or, alternatively, said top wall may be fixed and the basket 20 provided with side door means (not shown) operable for dumping purposes. A skeletal vane-type compactor 24 is pivotally mounted adjacent the top rear of the basket 20 and traverses substantially the full width of the basket.

Cylinder means 26 are pivotally mounted adjacent to the top front of the basket and the rods 27 thereof are pivotally connected to the compactor 24. As indicated by the arrow and dotted line showing in FIG. 1, the cylinders 26 are adapted to propel the compactor 24 from an upraised dwell position substantially parallel to the top wall 22 downwardly and rearwardly through an arcuate tamping stroke.

For purposes of propelling the harvester 10, there are provided a pair of front drive wheels 28, a transmission gear 29 (see FIG. 2) and a rear guide wheel or wheels 30. Conventional engine means, transmission means and hydraulic circuitry (not shown) are likewise provided, and the same are controllable by the operator from his station in the cab 14.

Figure 2:
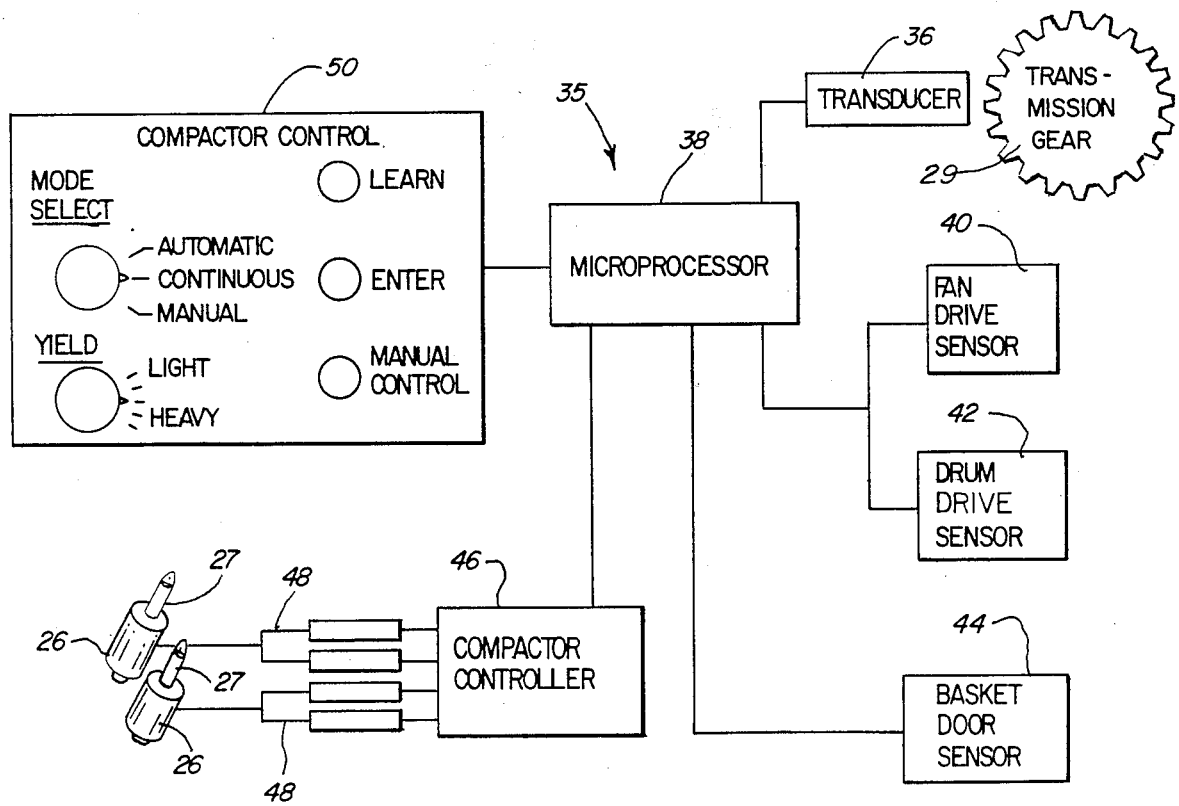
FIG. 2 is a flow diagram and schematic view of the programmable control of the invention illustrating the circuitry and relationship of parts.

Incorporated in the harvester 10 for automated control over operation of the compactor 24 is a programmable control 35 embodying the principles of the invention and illustrated schematically in FIG. 2 of the drawings. A transducer 36 of the type which may comprise a digital counter (i.e., magnetic, photoelectric or the like) is associated with transmission gear 29 and said transducer is electrically coupled to a microprocessor 38. A fan drive switch or sensor 40 and a drum drive switch or sensor 42 are in parallelism and electrically coupled to the microprocessor. Also coupled to the microprocessor 38 is a basket door switch or sensor 44. As will subsequently be more fully explained, microprocessor 38 begins and stops operation when the sensors 40 and 42 are activated or deactivated and resets for a new cycle of operation when sensor 44 is actuated.

Microprocessor 38 is coupled to and operates a compactor controller means 46 which includes ganged solenoid valves 48, 48, for driving the two-way cylinders 26, 26. A control panel 50 bearing labelled switches of the type illustrated is electrically connected to the microprocessor 38 and said panel is located in the harvester cab 14 for easy access by the operator.

Automated operation of the compactor 24 through the programmable control 35 can now be appreciated with reference to FIG. 2. At the outset, the operator sets the "mode select" switch to "automatic." He next selects the "yield" setting which, as previously described, will fix the dwell time of the compactor 24 between three-stroke cycles based on the density of the standing crop and the motive speed of the harvester. The operator then depresses the "learn" switch, engages the fan drive and the drum drive in the picking units 16, thereby actuating the sensors 42 and 44, and enters the rows of cotton to begin harvesting. As the harvester proceeds, transducer 36 counts the revolutions of the transmission gear 29. When the operator senses that compactor operation should begin, he depresses the "enter" switch which now acts as a memory of the gear revolutions, the linear ground traversed and the amount of cotton picked and blown into the basket 20. Harvesting now proceeds uninterruptedly with the compactor 24 in continuous operation. When the operator senses that the basket is full, or decides to leave the crop rows for any other reason, he disengages the fan and drum drives which stops operation of the compactor 24. When the basket door means is opened to dump the load, the sensor 44 is actuated to automatically reset the memorized program for the next basket load. When the harvester now re-enters the crop rows and the operator again engages the fan and drum drives and resumes picking, operation of the compactor 24 will start automatically at the same point in the load of harvested cotton without intervention by the operator. The entire cycle is now repeated automatically for each load in that workday.

While the invention has been described as comprising a transducer 36 in operational association with the transmission gear 29, it should be understood that the transducer could also be associated with a drive wheel 28 with equal effectiveness. The invention thus contemplates operation of the transducer for sensing the revolutions of either of said elements of the harvester drive transmission means.

It will be readily appreciated from the foregoing detailed description of the invention and the illustrative embodiment thereof that numerous variations and modifications may be effected without departing from the true spirit and scope of the novel concept of the principles of the invention.

What is claimed is:

1. In a self-propelled cotton harvester having, drive transmission means, driven cotton picking means, blower means and a basket for receiving the picked cotton blown thereinto, compactor means pivotally mounted in said basket;

cylinder means operationally associated with said compactor means; and programmable control means operatively associated with said cylinder means programmable to initiate automatic continuous operation of said compactor means at substantially the same point in each successive load of picked cotton in said basket which comprises transmission sensor means operatively associated with said drive transmission means, a cotton picking sensor means operatively associated with said cotton picking means and blower sensor means operatively associated with said blower means, whereby said control means is programmed responsive to revolutions of said transmission means signalled by said transmission sensor means, and is initiated and stopped respectively by activation and de-activation of both said cotton picking sensor means and said blower sensor means.

2. In a self-propelled cotton harvester according to claim 1, in which said basket comprises door means and said control means comprises basket door sensor means operatively associated with said basket, whereby opening of the door means of said basket for emptying the cotton load therein resets said control means for the programmed operation of said compactor means for the succeeding picked cotton load.

3. In a self-propelled cotton harvester having drive wheels, a transmission drive gear, driven cotton picker units, a blower, and a top-covered basket for the picked cotton blown thereinto, door means on the basket openable to facilitate the unloading of cotton;

a vane-like compactor pivotally mounted adjacent the top rear of said basket;

cylinder means pivotally mounted adjacent the top front of said basket connected to said compactor and operative to pivot said compactor between an upraised dwell position substantially parallel to the top cover and a downwardly rearward position to tamp cotton in said basket;

electrical control means operatively associated with said cylinder means for initiating automatic and continuous tamping cycles of said compactor by positioning thereof in said dwell position;

sensor means operatively associated with said blowers and picker units for respectively actuating and stopping operation of said control means; and programming sensor means operatively associated with said drive gear programming said control means comprising counter means for counting and electrically signalling the revolutions of said drive gear so that the initiation of said continuous tamping cycles occurs at substantially the same point in each successive load of cotton blown into said basket, and including reset sensor means operatively associated with said door means for resetting said counter means to zero when said door means is opened.

* * * * *